(12) United States Patent
Kanehara et al.

(10) Patent No.: US 10,876,014 B2
(45) Date of Patent: Dec. 29, 2020

(54) COATING COMPOSITION, COATING MATERIAL, CURED FILM, ARTICLE HAVING CURED FILM, AND METHOD FOR PRODUCING ARTICLE HAVING CURED FILM

(71) Applicant: NATOCO CO., LTD., Aichi (JP)

(72) Inventors: Fumiko Kanehara, Nagoya (JP); Yoshinori Eto, Nagoya (JP)

(73) Assignee: NATOCO CO., LTD., Aichi (JP)

( * ) Notice: Subject to any disclaimer, the term of this patent is extended or adjusted under 35 U.S.C. 154(b) by 136 days.

(21) Appl. No.: 15/779,590

(22) PCT Filed: Sep. 22, 2017

(86) PCT No.: PCT/JP2017/034260
§ 371 (c)(1),
(2) Date: May 29, 2018

(87) PCT Pub. No.: WO2019/058498
PCT Pub. Date: Mar. 28, 2019

(65) Prior Publication Data
US 2019/0256730 A1 Aug. 22, 2019

(51) Int. Cl.
| | | |
|---|---|---|
| *C09D 133/14* | (2006.01) | |
| *C09D 7/63* | (2018.01) | |
| *C09D 133/24* | (2006.01) | |
| *C09D 5/00* | (2006.01) | |
| *C09K 3/18* | (2006.01) | |
| *C08K 5/00* | (2006.01) | |

(52) U.S. Cl.
CPC ............. *C09D 133/14* (2013.01); *C09D 5/00* (2013.01); *C09D 7/63* (2018.01); *C09D 133/24* (2013.01); *C09K 3/18* (2013.01); *C08K 5/0025* (2013.01)

(58) Field of Classification Search
CPC .......... C09D 133/14; C09D 7/63; C09D 5/00; C09D 133/24; C09K 3/18; C08K 5/0025
USPC .......................................................... 427/508
See application file for complete search history.

(56) References Cited

U.S. PATENT DOCUMENTS

| | | |
|---|---|---|
| 7,335,690 B2 | 2/2008 | Plaut |
| 9,084,982 B2 | 7/2015 | Tanabiki |
| 2006/0167180 A1 | 7/2006 | Plaut |
| 2013/0274405 A1 | 10/2013 | Tanabiki |

FOREIGN PATENT DOCUMENTS

| | | | |
|---|---|---|---|
| EP | 1841807 B1 | | 10/2007 |
| JP | S63273668 A | | 11/1988 |
| JP | H10298489 A | | 11/1998 |
| JP | 2003012966 A | * | 1/2003 |
| JP | 2003012966 A | | 1/2003 |
| JP | 2008528728 A1 | | 7/2008 |
| JP | 2015140423 A | * | 8/2015 |
| JP | 2015140423 A | | 8/2015 |
| JP | 2016169287 A | | 9/2016 |
| JP | 2017008217 A | | 1/2017 |
| WO | 2006081079 A1 | | 8/2006 |
| WO | 2008056678 A1 | | 5/2008 |
| WO | 2012086552 A1 | | 6/2012 |

OTHER PUBLICATIONS

International Search Report dated Nov. 7, 2017 filed in PCT/JP2017/034260.

* cited by examiner

*Primary Examiner* — Ling Siu Choi
*Assistant Examiner* — Ronald Grinsted
(74) *Attorney, Agent, or Firm* — Rankin, Hill & Clark LLP

(57) ABSTRACT

Provided are a coating composition including a (meth) acrylic resin (A) containing a structural unit (a1) having an acetoacetoxy group and a structural unit (a2) having an amide group, a curing agent (B), and a surfactant (C); a coating material including a first coating material precursor composition containing the acrylic resin (A), but not containing the curing agent (B), and a second coating material precursor composition containing the curing agent (B), but not containing the (meth)acrylic resin (A), in which the first coating material precursor composition and/or the second coating material precursor composition contains the surfactant (C); a cured film made from such a coating composition or coating material; an article having a cured film; and a method for producing an article having a cured film of such a coating composition or coating material.

12 Claims, No Drawings

COATING COMPOSITION, COATING MATERIAL, CURED FILM, ARTICLE HAVING CURED FILM, AND METHOD FOR PRODUCING ARTICLE HAVING CURED FILM

TECHNICAL FIELD

The present invention relates to a coating composition, a coating material, a cured film, an article having a cured film, and a method for producing an article having a cured film.

BACKGROUND ART

Various technologies have been studied to prevent an article, such as a window glass, a lens, or a mirror, from "fogging" in a place with a large amount of moisture. In particular, a composition capable of forming a cured film having antifogging properties (antifogging coating composition) by coating and curing the composition on the surface of an article has been intensively studied.

For example, Patent Document 1 describes compositions containing a copolymer, a polyfunctional blocked isocyanate compound, and a surfactant as essential components. More specifically, compositions containing a copolymer of N, N-dimethylacrylamide, butyl acrylate and 2-hydroxyacrylate, a polyfunctional blocked isocyanate compound, sodium di(2-ethylhexyl) sulfosuccinate (surfactant), and the like are described in the Examples of Patent Document 1.

As another example, Patent Document 2 describes compositions containing a block or graft copolymer having a hydrophilic polymer portion and a hydrophobic polymer portion. More specifically, compositions containing a block copolymer synthesized from N,N-dimethylacrylamide, methoxydiethylene glycol methacrylate, N-methylol acrylamide, and the like, diisobutyl ester phosphate (catalyst), sodium dioctyl sulfosuccinate (surfactant), and the like are described in the Examples of Patent Document 2.

As a further example, Patent Document 3 describes coating compositions containing a specific acrylic resin (acrylic resin having a monomer unit derived from a monomer having an acetoacetoxy group and a methacryloyloxy group, a monomer unit derived from a monomer having a (meth) acrylamide group, and a polydimethylsiloxane chain) and a polyfunctional monomer. More specifically, coating compositions containing a copolymer of dimethylacrylamide, 2-acetoacetoxyethyl methacrylate, one-terminal methacrylate-modified polydimethylsiloxane and methyl methacrylate, dipentaerythritol hexaacrylate, diazabicycloundecene, and the like are described in the Examples of Patent Document 3. Further, in the Comparative Examples of Patent Document 3, coating compositions containing a copolymer of dimethylacrylamide, 2-acetoacetoxyethyl methacrylate and methyl methacrylate, dipentaerythritol hexaacrylate, diazabicycloundecene, and the like are described.

RELATED DOCUMENT

Patent Document

[Patent Document 1] Japanese Unexamined Patent Publication No. 2016-169287
[Patent Document 2] Japanese Unexamined Patent Publication No. 2017-008217
[Patent Document 3] Japanese Unexamined Patent Publication No. 2015-140423

SUMMARY OF THE INVENTION

Technical Problem

As described above, antifogging coating compositions have been studied extensively.

Nevertheless, there is a need in the market for further improvements in antifogging coating compositions. For example, there is a need for a coating composition capable of forming an antifogging cured film having an excellent antifogging performance and an excellent durability such that the antifogging cured film is not likely to be peeled off due to sufficiently strong adhesion to the surface of an article.

Therefore, an object of the present invention is to provide a coating composition capable of forming a cured film having an excellent durability and a good antifogging performance.

Solution to Problem

As a result of extensive studies, the present inventors have found that the above-mentioned object can be achieved by making the following disclosure.

According to the present invention, provided is a coating composition, including:
a (meth)acrylic resin (A) containing a structural unit (a1) having an acetoacetoxy group and a structural unit (a2) having an amide group;
a curing agent (B); and
a surfactant (C).

Further, according to the present invention, provided is a coating material, including:
a first coating material precursor composition contained in a first container; and
a second coating material precursor composition contained in a second container,
in which the first coating material precursor composition contains a (meth)acrylic resin (A) having a structural unit (a1) having an acetoacetoxy group and a structural unit (a2) having an amide group and does not contain a curing agent (B),
the second coating material precursor composition contains the curing agent (B) and does not contain the (meth)acrylic resin (A), and
the first coating material precursor composition and/or the second coating material precursor composition contains a surfactant (C).

Further, according to the present invention, provided is a cured film of the above coating composition.

Further, according to the present invention, provided is an article including the above cured film.

Further, according to the present invention, provided is a method for producing an article having a cured film, including:
a coating step of coating a substrate with the above coating composition; and
a heat curing step of heating the coating composition coated on the substrate to cure the coating composition.

Further, according to the present invention, provided is a method for producing an article having a cured film, including:
a coating step of coating a substrate with the above coating composition according; and a photo-curing step of irradiating the coating composition coated on the substrate with actinic rays to cure the coating composition.

Advantageous Effects of Invention

According to the present invention, it is possible to provide a coating composition capable of forming a cured film having an excellent durability and a good antifogging performance.

DESCRIPTION OF EMBODIMENTS

Hereinafter, embodiments of the present invention will be described in detail.

In the present specification, the notation "a to b" in the description of the numerical range indicates a range of a or more and b or less, unless otherwise specified.

In the description of a group (atomic group) in the present specification, the notation which does not indicate the substitution or the non-substitution includes both of a group having no substituent and a group having a substituent. For example, an "alkyl group" includes not only an alkyl group having no substituent (an unsubstituted alkyl group) but also an alkyl group having a substituent (substituted alkyl group).

The notation "(meth)acrylic" in the present specification represents the concept that encompasses both acrylic and methacrylic. The same shall apply to similar expressions such as "(meth)acrylate".

<Coating Composition>

The coating composition of the present embodiment contains a (meth)acrylic resin (A) containing a structural unit (a1) having an acetoacetoxy group and a structural unit (a2) having an amide group, a curing agent (B), and a surfactant (C).

Hereinafter, the (meth)acrylic resin (A) is also referred to as "resin (A)", the structural unit (a1) having an acetoacetoxy group is also referred to as "structural unit (a1), and the structural unit (a2) having an amide group is also referred to as "structural unit (a2)".

The reason why the coating composition of the present embodiment is capable of forming a cured film having a good antifogging performance and an excellent durability is not necessarily clear at all, but it can be explained as follows.

First, the durability of the cured film will be described.

Hydrogens in the methylene of the acetoacetoxy group ($CH_3$—CO—$CH_2$—CO—O—) contained in the resin (A) are sandwiched between two electron withdrawing groups (CO: carbonyl group), which are therefore highly acidic and dissociates easily. That is, the hydrogens in the methylene group of the acetoacetoxy group are dissociated, which is likely to result in the generation of a carbanion or radical between the two carbonyl groups. It is believed that the resulting carbanion or radical reacts well with the curing agent (B) to form a crosslinked structure, resulting in a cured film having an excellent durability.

In particular, it is considered that the cross linked structure, which is formed by the reaction of the acetoacetoxy group with the curing agent (B), is chemically strong and is unlikely to be decomposed by a reverse reaction or the like. It is thus considered that an excellent durability is obtained.

Here, in the Examples of Patent Document 1, it is considered that a urethane bond is formed due to the reaction between a hydroxy group contained in a 2-hydroxyacrylate and the like in the resin and a polyfunctional blocked isocyanate compound, so that a crosslinked structure is formed. The urethane bond is known to undergo hydrolysis over time, and therefore there is a possibility that the composition of Patent Document 1 is inferior in durability to the coating composition of the present embodiment.

Further, in the Example of Patent Document 2, the curing agent is not contained in the composition as a sole component. Therefore, there is a possibility that the curing is insufficient and the durability is slightly poorer than that of the coating composition of the present embodiment.

Next, the antifogging performance of the cured film will be described.

The amide group contained in the resin (A) has a high hydrophilicity and is therefore liable to retain water. That is, it is considered that, in the place where moisture is present, the cured film absorbs water due to the existence of the amide group, and the antifogging properties are obtained.

In the case where the amount of water absorbed by the cured film exceeds a certain amount, a part of the absorbed water becomes fine water droplets on the surface of the cured film, which may cause fogging. But, in the present embodiment, the presence of the surfactant (C) in the cured film reduces the surface tension of the water absorbed in the cured film, and therefore the water absorbed in the cured film does not become "water droplets" but spreads thinly and uniformly on the surface of the cured film.

In other words, it is considered that the combination of the amide group in the resin (A) and the surfactant (C) results in a synergistic action by which: (1) first, the cured film absorbs water, (2) the water is then "uniformly spread" on the surface of the cured film, and as a result, the fogging is sufficiently suppressed even in the case where there is a large amount of moisture.

In the column of "Problems to be Solved by the Invention" of Patent Document 3, in the case where the coating film formed by the antifogging coating composition contains a surfactant, it is stated that there is a problem with the use of the surfactant: "The surfactant may dissolve into the water film formed on the surface of the coating film. The dissolved surfactant tends to subsequently precipitate on the coating film due to the drying of water in the water film and to remain as water trail marks." (see paragraph [0008] of Patent Document 3). That is, in Patent Document 3, it is considered that the use of a surfactant has been regarded negatively, and there is no description or suggestion of the above-mentioned synergistic action between the amide group in the resin and the surfactant.

In addition, the invention disclosed in Patent Document 3 is characterized in that the resin contained in the composition contains a "polydimethylsiloxane chain" having water-repellent properties. In other words, it is considered that the invention of Patent Document 3 is the idea in which the film itself is designed to be water-repellent, and is different from the idea of the above-mentioned "antifogging by absorption of water".

Components contained in the coating composition of the present embodiment will be described.

[Resin (A)]

The coating composition of the present embodiment contains a resin (A), that is, a (meth)acrylic resin containing a structural unit (a1) having an acetoacetoxy group and a structural unit (a2) having an amide group.

As mentioned above, it is considered that the structural unit (a1) is mainly involved in the crosslinking reaction, and the structural unit (a2) is mainly involved in the absorption of water (moisture).

Typically, the resin (A) can be obtained by polymerizing monomers corresponding to the structural unit (a1) and the structural unit (a2). Details of the polymerization method will be described later.

In the present embodiment, 100% of the structural units constituting the resin (A) may not be structural units derived from (meth)acrylic monomers. In other words, the resin (A) may contain some (but not all) structural units derived from monomers that are not (meth)acrylic monomers.

For example, even in the case where the monomers corresponding to the structural unit (a1) and/or the structural unit (a2) are monomers that do not contain a (meth)acrylic structure, such a case is not excluded from the present embodiment.

From the viewpoint of sufficiently obtaining the effect derived from the (meth)acrylic structure, it is preferred that the resin (A) contains a structural unit derived from a (meth)acrylic monomer in an amount of 50% by mass or more of the total structural units. More preferably, 80% by mass or more of the total structural units of the resin (A) is a structural unit derived from a (meth)acrylic monomer. Still more preferably, the total (100%) structural units of the resin (A) are structural units derived from a (meth)acrylic monomer.

The monomer corresponding to the structural unit (a1) is not particularly limited, and examples thereof include acetoacetoxyalkyl (meth)acrylates such as acetoacetoxyethyl (meth)acrylate (AAEM), acetoacetoxypropyl (meth)acrylate, acetoacetoxybutyl (meth)acrylate, and 2,3-di(acetoacetoxy) propyl (meth)acrylate.

The resin (A) may contain a plurality of repeating units corresponding to the structural unit (a1). For example, the resin (A) may be obtained by carrying out a polymerization reaction using two or more of the monomers listed above.

The monomer corresponding to the structural unit (a2) is also not particularly limited and may be, for example, (meth)acrylic acid amide, and more specifically (meth)acrylamide or N,N-dialkyl (meth)acrylamide. Among these, N,N-dialkyl (meth)acrylamide is preferred.

Specific examples of the monomer corresponding to the structural unit (a2) include dimethyl (meth)acrylamide, diethyl (meth)acrylamide, di-n-propyl (meth)acrylamide, dibutyl (meth)acrylamide, N,N-dimethylaminoethyl (meth)acrylamide, N,N-dimethylaminopropyl (meth)acrylamide, N,N-diethylaminoethyl (meth)acrylamide, N,N-diethylaminopropyl (meth)acrylamide, N-vinyl pyrrolidone, N-hydroxyethyl (meth)acrylamide, N-hydroxypropyl (meth)acrylamide, N-hydroxyisopropyl (meth)acrylamide, N-methylhydroxyethyl (meth)acrylamide, N-methylhydroxypropyl (meth)acrylamide, N-methylhydroxyisopropyl (meth)acylamide, N-ethylhydroxyethyl (meth)acylamide, N-ethylhydroxypropyl (meth)acrylamide, N-ethylhydroxyisopropyl (meth)acrylamide, N-propylhydroxyethyl (meth)acrylamide, N-propylhydroxypropyl (meth)acrylamide, N-propylhydroxyisopropyl (meth)acrylamide, N-isopropyl (meth)acrylamide, N-isopropylhydroxyethyl (meth)acrylamide, N-isopropylhydroxypropyl (meth)acrylamide, N-isopropylhydroxyisopropyl (meth)acrylamide, methoxymethyl (meth)acrylamide, ethoxymethyl (meth)acrylamide, butoxymethyl (meth)acrylamide, isobutoxymethyl (meth)acrylamide, methoxyethyl (meth)acrylamide, ethoxyethyl (meth)acrylamide, ethoxypropyl (meth)acrylamide, methoxybutyl (meth)acrylamide, butoxymethyl (meth)acrylamide, butoxyethyl (meth)acrylamide, allyl (meth)acrylamide, 2-ethylhexyl (meth)acrylamide, acryloylmorpholine, and diacetone acrylamide.

The resin (A) may contain a plurality of repeating units corresponding to the structural unit (a2). For example, the resin (A) may be obtained by carrying out a polymerization reaction using two or more of the monomers listed above.

The content of the structural unit (a1) in the resin (A) is usually 10 to 70% by mass, preferably 15 to 50% by mass, and more preferably 20 to 40% by mass with respect to the total structural units of the resin (A).

The content of the structural unit (a2) in the resin (A) is usually 20 to 85% by mass, preferably 30 to 80% by mass, and more preferably 40 to 75% by mass with respect to the total structural units of the resin (A).

The resin (A) may or may not contain any structural unit (structural unit (a3)) other than the structural unit (a1) and the structural unit (a2). The structural unit (a3) is, for example, a structural unit derived from the monomers shown in (i) or (ii) below. By including such a structural unit in the resin (A), it is possible to adjust and optimize the glass transition temperature of the resin (A) and the physical properties of the cured film (hardness, softness, and the like of the cured film).

(i) Monomer in which R is a hydrogen atom or a methyl group, and R' is an alkyl group, a monocyclic or polycyclic cycloalkyl group, an aryl group, or an aralkyl group in General Formula of $CH_2=CR-COO-R'$.

Specific examples of such a monomer include methyl (meth)acrylate, ethyl (meth)acrylate, n-butyl (meth)acrylate, isobutyl (meth)acrylate, tert-butyl (meth)acrylate, 2-ethylhexyl (meth)acrylate, isodecyl (meth)acrylate, n-lauryl (meth)acrylate, n-stearyl (meth)acrylate, phenyl (meth)acrylate, and benzyl (meth)acrylate.

Of these, R' is preferably an alkyl group having 1 to 8 carbon atoms, R' is more preferably an alkyl group having 1 to 6 carbon atoms, and R' is still more preferably an alkyl group having 1 to 4 carbon atoms.

(ii) Monomer in which R is a hydrogen atom or a methyl group and R' is an organic group (an alkyl group, a monocyclic or polycyclic cycloalkyl group, an aryl group, an aralkyl group, or the like) substituted with a polar group such as a hydroxy group in General Formula of $CH_2=CR-COO-R'$.

Specific examples of such a monomer include 2-hydroxyethyl (meth)acrylate, hydroxypropyl (meth)acrylate, and hydroxybutyl (meth)acrylate.

The resin (A) may contain a plurality of repeating units corresponding to the structural unit (a3). For example, the resin (A) may be obtained by carrying out a polymerization reaction using two or more of monomers as the specific examples described above.

In the case where the resin (A) contains the structural unit (a3), the content thereof is preferably 3 to 60% by mass, more preferably 5 to 50% by mass, and still more preferably 10 to 45% by mass with respect to the total structural units of the resin (A).

It is preferred that the resin (A) does not contain a fluorine atom or a silicon atom, or even in the case where the resin (A) contains a fluorine atom or a silicon atom, the amount thereof is small, because the cured film has sufficient hydrophilicity and water absorption.

Specifically, in the resin (A), the content of a structural unit containing a fluorine atom or a silicon atom is preferably 0 to 10% by mass and more preferably 0 to 5% by mass with respect to the total structural units of the resin (A). Still more preferably, the resin (A) does not contain a structural unit containing a fluorine atom or a silicon atom.

The weight-average molecular weight (Mw) of the resin (A) is preferably 5,000 to 1,000,000 and more preferably 10,000 to 100,000.

The weight-average molecular weight can be determined by gel permeation chromatography (GPC) using polystyrene as a standard substance.

The glass transition temperature of the resin (A) is not particularly limited, but it is preferably 20° C. to 120° C., more preferably 40° C. to 110° C., and still more preferably 45° C. to 100° C.

In the case where the resin is a copolymer, the glass transition temperature thereof can be determined by various methods. For example, the glass transition temperature can be determined based on the following Fox equation.

$$1/Tg = (W_1/Tg_1) + (W_2/Tg_2) + (W_3/Tg_3) + \ldots + (W_n/Tg_n)$$

In the equation, Tg is a glass transition temperature (K) of the resin, $W_1, W_2, W_3 \ldots W_n$ are the mass fractions of the respective monomers, and $Tg_1, Tg_2, Tg_3 \ldots Tg_n$ respectively represent a glass transition temperature (K) of a homopolymer consisting of monomers corresponding to the mass fraction of each monomer.

In the present specification, the glass transition temperature of the resin (A) (the glass transition temperature of the resin (A) alone, not the glass transition temperature of the cured film) means the glass transition temperature determined based on the above equation. For monomers whose glass transition temperature is unknown, such as special monomers or polyfunctional monomers, the glass transition temperature is determined using only the monomers for which the glass transition temperature has been determined.

Typically, the resin (A) can be obtained by a polymerization reaction. The polymerization reaction may be any of various methods such as radical polymerization, cationic polymerization, and anionic polymerization, among which radical polymerization is preferable. The polymerization may be any of solution polymerization, suspension polymerization, and emulsion polymerization. Among these, solution polymerization is preferable from the viewpoint of precise control of polymerization and the like.

A known polymerization initiator can be used as the polymerization initiator for the radical polymerization. Examples of the known polymerization initiator include azo-based initiators such as azobisisobutyronitrile, 2,2-azobis (2-methylbutyronitrile) 2,2-azobis(2-methylpropionitrile), and 2,2-azobis (2,4-dimethylvaleronitrile); peroxide-based initiators such as benzoyl peroxide, t-butyl peroxyoctanoate, diisobutyl peroxide, di(2-ethylhexyl) peroxypivalate, decanoylperoxide, t-butylperoxy-2-ethylhexanoate, and t-butylperoxybenzoate; and redox-based initiators combining oxidizing agents and reducing agents, such as combination of hydrogen peroxide andiron (II) salt, and combination of persulfate and sodium hydrogen sulfite. These initiators may be used alone or in combination of two or more thereof.

The blending amount of the polymerization initiator is not particularly limited, but it is preferably 0.001 to 10 parts by mass in the case where the total amount of the mixture of the monomers to be polymerized is 100 parts by mass.

In the polymerization reaction, known chain transfer agents, polymerization inhibitors, molecular weight modifiers, and the like may be suitably used. The polymerization reaction may be carried out in one step or in two or more steps. The temperature of the polymerization reaction is not particularly limited, but it is typically within the range of 50° C. to 200° C. and preferably 80° C. to 150° C.

The content of the resin (A) in the coating composition is preferably 50 to 99% by mass and more preferably 60 to 98% by mass with respect to the total amount of the coating composition.

[Surfactant (C)]

The coating composition of the present embodiment contains a surfactant (C).

The surfactant (C) is not particularly limited, and any known surfactant can be appropriately used. For example, various surfactants such as cationic, anionic, nonionic, and amphoteric surfactants can be used. Specific examples of the surfactant (C) include a sulfonate anion (for example, dialkyl sulfosuccinate), a polyoxyethylene sorbitan fatty acid ester, a glycerin fatty acid ester, an amphoteric compound (for example, a betaine compound), a sucrose fatty acid ester, and a fluorine-based nonionic compound.

The surfactant (C) is preferably at least one selected from the group consisting of a dialkyl sulfosuccinatte, an amphoteric compound (a betaine compound or the like), a sucrose fatty acid ester, and a fluorine-based nonionic compound. In addition to these, preferred is a polyoxyethylene sorbitan fatty acid ester.

According to the knowledge of the present inventors, such a preferred surfactant (C) is considered to bleed out properly from the cured film (the surfactant gradually permeates from the inside of the cured film to the surface of the cured film over time). As a result, it is expected to achieve an effect that the deterioration of the antifogging performance is suppressed even in the case where the steam is repeatedly applied, or the antifogging performance is satisfactory even after the cured film is wiped off (that is, a higher level of antifogging performance rather than just antifogging performance).

As another aspect of the composition design, two or more surfactants (C) may be used in combination.

No particular limitation is imposed on the combination of any of the surfactants (C). According to the discovery by the present inventors, it is preferable to use, for example, at least one anionic surfactant and at least one nonionic surfactant in combination. Although the specific mechanism for why this combination is desirable is unknown, it is presumed that, by the combined use of different types of surfactants, which are anionic and nonionic and which are believed to greatly differ in electrostatic interactions with water, the water absorbed by the cured film becomes more likely to diffuse to the surface of the cured film and consequently a higher level of antifogging performance can be obtained.

In the case where the surfactant (C) contains a sulfonate anion, examples of commercially available products thereof include "NEOPELEX" series and "PELEX" series, which are trade names of Kao Corporation.

In particular, in the case where the surfactant (C) contains a dialkyl sulfosuccinate, commercially available products thereof include SANMORIN OT series (such as Sanmorin OT-70) and Carabon DA-72, which are trade names of Sanyo Chemical Industries, Ltd.), and PELEX OT-P, PELEX TA and PELEX TR, which are trade names of Kao Corporation.

In the case where the surfactant (C) contains a cationic surfactant (such as a quaternary ammonium salt), a commercially available product thereof is, for example, a cationic surfactant which is commercially available from DKS Co. Ltd. under the name "Catiogen" (registered trademark).

In the case where the surfactant (C) contains an amphoteric compound (for example, a betaine compound), examples of commercially available products thereof include "SOFTAZOLINE" series, which is a trade name of Kawaken Fine Chemicals Co., Ltd., such as SOFTAZOLINE LSB, SOFTAZOLINE LPB, and SOFTAZOLINE LPB-R.

In the case where the surfactant (C) contains a polyoxyethylene sorbitan fatty acid ester, examples of commercially available products thereof include product numbers TW-TS399C, TW-L106, TW-L120, TW-O106V, TW-O120V, TW-O320V, TW-P120, TW-S120V, TW-S320V, and TW-S106V of "RHEODOL" series, which is a trade name of Kao Corporation, and product number TW-L120 of trade name "RHEODOL SUPER".

In the case where the surfactant (C) contains a glycerin fatty acid ester, examples of commercially available products thereof include MO-7S, ML-750, ML-500, ML-310, and MM-750, which are trade names of Sakamoto Yakuhin Kogyo Co., Ltd., and RHEODOL MS-50, RHEODOL MS-60, RHEODOL MO-60, and RHEODOL MS-165V, which are trade names of Kao Corporation.

In the case where the surfactant (C) contains a sucrose fatty acid ester, examples of commercially available products thereof include product numbers L-1695, M-1670, and P-1695 in Ryoto (registered trademark) sugar esters of Mitsubishi-Chemical Foods Corporation.

In the case where the surfactant (C) contains a fluorine-based nonionic compound, examples of commercially available products thereof include product number S-242, product number S-243, and product number S-420 of SURFLON series which is a trade name of by AGC Seimi Chemical Co., Ltd.

The amount of the surfactant (C) is preferably 0.5 to 10 parts by mass and more preferably 1 to 8 parts by mass with respect to 100 parts by mass of the resin (A). By setting the amount of the surfactant (C) to such a range, it is considered that the above-mentioned synergistic action between the resin (A) and the surfactant (C) can be optimized and therefore the antifogging performance can be optimized.

[Curing Agent (B)]

The coating composition of the present embodiment contains a curing agent (B). The curing agent (B) typically reacts with the resin (A) to form a crosslinked structure, whereby the coating composition is cured.

The curing agent (B) preferably contains a polyfunctional (meth)acrylate compound. Since the ethylenic double bond of the polyfunctional (meth)acrylate compound has good reactivity with the acetoacetoxy group of the resin (A), and the chemical bond formed is chemically stable, it is presumed that such an ethylenic double bond of the polyfunctional (meth)acrylate compound contributes to the durability of the cured film.

The polyfunctional (meth)acrylate compound is preferably a difunctional to octafunctional (meth)acrylate compound (that is, a compound containing 2 to 8 (meth)acryloyl groups in one molecule) and more preferably a difunctional to hexafunctional (meth)acrylate compound.

Examples of difunctional (meth)acrylate compounds include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-PO adduct di(meth)acrylate, hydroxypivalic acid neopentyl glycol di(meth)acrylate, and polytetramethylene glycol di(meth)acrylate.

Examples of trifunctional or higher-functional (meth)acrylate compounds include trimethylolpropane tri(meth)acrylate, pentaerythritol tri(meth)acrylate, polyalkylene glycol-modified trimethylolpropane tri(meth)acrylate, pentaerythritol tetra(meth)acrylate, polyalkylene glycol-modified pentaerythritol tetra(meth)acrylate, dipentaerythritol hexa(meth)acrylate, ditrimethylol propane tetra(meth)acrylate, glycerin propoxy tri(meth)acrylate, caprolactone-modified trimethylol propane tri(meth)acrylate, pentaerythritol ethoxy tetra(meth)acrylate, and caprolactam-modified dipentaerythritol hexa(meth)acrylate.

Among these, dipentaerythritol hexa(meth)acrylate, dipentaerythritol penta(meth)acrylate, pentaerythritol tri(meth)acrylate, pentaerythritol tetra(meth)acrylate, and polyalkylene glycol-modified pentaerythritol tetra(meth)acrylate are preferable.

It is not excluded that the curing agent (B) is not a polyfunctional (meth)acrylate. For example, a polyfunctional isocyanate compound, a polyfunctional epoxy compound, or the like can also be used as the curing agent (B).

The amount of the curing agent (B) is preferably 5 to 30 parts by mass and more preferably 7 to 20 parts by mass with respect to 100 parts by mass of the resin (A). It is considered that a cured film having a better durability is obtained by setting the amount of the curing agent (B) to such a range.

[Basic Compound (D)]

In an embodiment, the coating composition of the present embodiment preferably contains a basic compound (D). In particular, the basic compound (D) is preferable in the case where the coating composition of the present embodiment is coated on a substrate and then cured by heat to form a cured film. It is presumed that the hydrogen atoms of methylene of the acetoacetoxy group are easily dissociated by the basic compound (D), and as a result, the curing reaction is accelerated.

The basic compound (D) is not particularly limited and may be an organic base or an inorganic base. For example, a metal hydroxide, a metal alkoxide, a metal carbonate, a quaternary ammonium salt compound, a primary to tertiary amine, or a nitrogen-containing heterocyclic compound or a salt thereof can be used.

Among them, a nitrogen-containing heterocyclic compound or a salt thereof is preferred. The nitrogen-containing heterocyclic compound and the salt thereof are more preferably those containing an amidine skeleton (for example, DBU or DEN described below).

Examples of the nitrogen-containing heterocyclic compound include pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo[5,4,0]undecene-7 (also known as diazabicycloundecene, abbreviation: DBU), 6-(dibutylamino)-1,8-diazabicyclo[5,4,0]undecene-7 (abbreviation: DBA-DBU), 6-(2-hydroxypropyl)-1,8-diazabicyclo[5,4,0]undec-7-ene (abbreviation: OH-DBU), 1,5-diazabicyclo[4,3,0]nonene-5 (abbreviation: DEN), 1,4-diazabicyclo[2,2,2]octane (DABCO), and aziridine.

Examples of the salt of the nitrogen-containing heterocyclic compound include DBU phenoxide (specifically, trade name: U-CAT SA1, manufactured by San-Apro Ltd.), DBU octylate (specifically, trade name: U-CAT SA102, manufactured by San-Agro Ltd.), DBU p-toluenesulfonate (specifically, trade name: U-CAT SA506, manufactured by San-Agro Ltd.), and DEN octylate (specifically, trade name: U-CAT 1102, manufactured by San-Apro Ltd.).

In the case where the basic compound (D) is used, only one kind thereof may be used, or two or more kinds thereof may be used in combination.

In the case where the basic compound (D) is used, the content thereof is preferably 0.01 to 3 parts by mass, more preferably 0.05 to 2.5 parts by mass, and still more preferably 0.1 to 2.0 parts by mass with respect to 100 parts by mass of the (meth)acrylic resin (A). By setting the amount of the basic compound (D) to such a range, the effect of the basic compound (D) can be sufficiently obtained. For example, it is considered that the curing reaction is sufficiently promoted and therefore a cured film having a high durability is obtained.

[Other Components]

The coating composition of the present embodiment may contain components other than the above-mentioned components (A) to (D). For example, suitable amounts of various additives used in the field of coating materials, such as a leveling agent, a rheology modifier, an antifoaming agent, an antioxidant, and an ultraviolet absorber, may be contained in the coating composition of the present embodiment.

[Design of Physical Properties of Cured Film]

As described above, the coating composition of the present embodiment is believed to exhibit an antifogging performance due to the mechanism in which the amide group of the resin (A) actively absorbs moisture. From the viewpoint of this mechanism, the fact that the cured film formed using the coating composition of the present embodiment is hydrophilic to some extent is considered to be desirable in view of the absorption of moisture.

In other words, the coating composition can be designed using the "hydrophilicity" of the cured film as an index.

Specifically, in the case where a cured film having a film thickness of 10 μm is formed using the coating composition of the present embodiment, it is preferable to design the coating composition so that the contact angle $\theta_1$ after 1 second after the cured film is brought into contact with the water is preferably 70° or less, more preferably 65° or less. The lower limit of $\theta_1$ is not particularly limited, but it is preferably 25° C. or more. By designing the lower limit of $\theta_1$ to such a range, the bleed-out amount of the surfactant can be appropriately suppressed and therefore antifogging properties can be expected to be maintained after dew condensation has been wiped off.

Here, the value of $\theta_1$ can be controlled by appropriately selecting the type and amount of each component in the coating composition, the method of preparing the composition, the coating method, and the like. For example, the value of $\theta_1$ can be controlled by designing the resin (A) to contain no fluorine atoms or silicon atoms, or to contain a small amount of fluorine atoms or silicon atoms even in the case of containing such atoms, selecting a hydrophilic surfactant as the surfactant (C), using an appropriate amount of the surfactant (C), or the like.

From the viewpoint of the persistence of the antifogging effect and the antifogging effect under severe conditions, it is preferable to design the coating composition using temporal change of hydrophilicity, for example, the temporal change in the contact angle of water on the surface of the cured film as an index.

Specifically, in the case where a cured film having a film thickness of 10 μm is formed using the coating composition of the present embodiment, it is preferable to design the coating composition so that the value of $\theta_1-\theta_2$ is 5° or more and the value of $\theta_2$ is 45° or less ($\theta_1$ is as defined above), assuming that the contact angle after 20 seconds from the contact of the cured film with water is taken as $\theta_2$.

By designing the coating composition as described above, it is expected that antifogging properties can be obtained even under severe conditions (for example, in the case where the cured film is continuously exposed to moisture; the cured film is repeatedly exposed to moisture; or the water on the cured film is once wiped and then the cured film is again exposed to moisture).

That is, by designing the coating composition in such a manner that the contact angle of the cured film surface is decreased by 5° or more with a lapse of 20 seconds and therefore the contact angle $\theta_2$ is 45° or less, it is considered that the hydrophilicity of the surface of the cured film is likely to be maintained even in the case where moisture is continuously supplied/in a large amount to the cured film. In other words, it is expected that a sufficient antifogging performance can be obtained even under severe conditions.

The value of $\theta_2$ (and the value of $\theta_1-\theta_2$) can be controlled appropriately selecting the type and amount of each component in the coating composition, the method of preparing the composition, the coating method, and the like. For example, the value of $\theta_2$ (and the value of $\theta_1-\theta_2$) can be controlled by selecting a surfactant which appropriately bleeds out, as the surfactant (C). Further, the value of $\theta_2$ (and the value of $\theta_1-\theta_2$) can also be controlled, for example, by adjusting the content of the structural unit (a1) in the resin (A), the content of the curing agent (B), the density of the crosslinkable functional group, or the like to control the crosslinking reaction, or by forming a suitable bleed-out gap of the surfactant (C) in the cured film.

The measurement of $\theta_1$ and $\theta_2$ can be carried out based on a known method, for example, a θ/2 method. For details, including the method of forming a cured film for evaluation, please refer to the method described in the following Examples.

<Coating Material>

The coating material of the present embodiment is a coating material including a first coating material precursor composition contained in a first container, and a second coating material precursor composition contained in a second container, in which the first coating material precursor composition contains a (meth)acrylic resin (A) having a structural unit (a1) having an acetoacetoxy group and a structural unit (a2) having an amide group and does not contain a curing agent (B), the second coating material precursor composition contains the curing agent (B) and does not contain the (meth)acrylic resin (A), and the first coating material precursor composition and/or the second coating material precursor composition contains a surfactant (C).

Here, the (meth)acrylic resin (A), the curing agent (B), and the surfactant (C) are the components respectively described in the foregoing <Coating composition>.

That is, in the coating material of the present embodiment, among the components included in the foregoing <Coating composition>, the resin (A) is contained only in the first container, the curing agent (B) is contained only in the second container, and the surfactant C) is contained in one or both of the first container and the second container.

In this manner, the storage stability of the coating material can be enhanced.

In addition, one or both of the first coating material precursor composition and the second coating material precursor composition may further contain a basic compound (D). As for the basic compound (D), a third container may be further prepared and then the basic compound (D) may be contained in the third container In the case where the basic compound (D) is used, it is preferably contained in the second coating material precursor composition from the viewpoint of inhibiting the reaction with the acetoacetoxy group and from the viewpoint of not increasing the number of containers unnecessarily.

With respect to the coating material of the present embodiment, a coating composition can be prepared by mixing the first coating material precursor composition and the second coating material precursor composition (in some cases, further mixing the basic compound (D)) immediately before forming an antifogging cured film on an article.

<Method for Producing Article Having Cured Film>

In the present embodiment, examples of the method for producing an article having a cured film using a coating composition include the following production method (i) and production method (ii).

Production Method (i):

A method for producing an article having a cured film, including
  a coating step of coating a coating composition on a substrate, and
  a heat curing step of heating the coating composition coated on the substrate to cure the coating composition.

Production Method (ii):

A method for producing an article having a cured film, including,
  a coating step of coating a coating composition on a substrate, and
  a photo-curing step of irradiating the coating composition coated on the substrate with actinic rays to cure the coating composition.

The production method (i) will be described.

In the coating step, the coating composition coated on the substrate is as described in the foregoing <Coating composition>. At this time, the coating composition preferably contains the above-mentioned basic compound (D).

The substrate on which the coating composition is to be coated is not particularly limited and it is possible to adopt various substrates which are required to have antifogging properties, such as a glass substrate and a transparent plastic substrate (for example, an acrylic resin substrate or a polycarbonate resin substrate). More specifically, the coating composition can be coated on window glass for buildings, window glass for automobiles, various mirrors, various optical lenses, goggles, protective glasses, light parts for two-wheeled and four-wheeled vehicles, parts of refrigerators, or the like. In addition, the coating composition is not only coated on a visible portion in a normal use mode, but may also be coated on the interior of various equipment for the purpose of suppressing dew condensation.

The surface of the substrate may be subjected to an appropriate pretreatment from the viewpoint of enhancing the coatability and adhesiveness of the coating composition. For example, a pretreatment for removing surface contaminants, or a pretreatment for providing a suitable undercoat layer may be carried out.

The coating method of the coating composition is not particularly limited. Examples of the coating method include a spraying method, a flow coating method, a roll coating method, a brush coating method, a dip coating method, a spin coating method, a screen printing method, a casting method, a gravure printing method, and a flexographic printing method. Of these, spray coating is preferable from the viewpoint of obtaining a uniform cured film.

The film thickness of the coating is not particularly limited, but from the viewpoint of obtaining a sufficient antifogging performance, the film thickness of the final cured film is adjusted to be, for example, 1 to 50 μm, preferably 5 to 25 μm.

In the heat curing step, the coating composition coated on the substrate is heated using an oven, a drying oven, or the like. Thereby, the coating composition is cured to obtain a cured film. More specifically, the substrate coated with the coating composition is allowed to stand in an atmosphere of 50° C. to 150° C. for 30 seconds to 120 minutes to cure the coating composition.

Production method (ii) will be described.

The coating step is almost the same as in the production method (i), provided that the coating composition may not contain the above-mentioned basic compound (D).

In the photo-curing step, a coating composition coated on a substrate is irradiated with actinic rays (preferably ultraviolet light) using a mercury lamp or the like, whereby the coating composition is cured to obtain a cured film. The integrated light quantity of actinic rays is, for example, 100 to 1,000 mJ/cm$^2$.

<Cured Film and Article Having Cured Film>

In the present embodiment, a cured film and an article having a cured film are typically obtained based on the foregoing <Method for producing article having cured film>.

The cured film and the article having a cured film of the present embodiment have an excellent durability and a good antifogging performance.

Although the embodiments of the present invention have been described above, those embodiments are examples of the present invention, and various configurations other than those described above can be adopted. The present invention is not limited to the above-described embodiments, and modifications and improvements within the scope of achieving the object of the present invention are encompassed by the present invention.

EXAMPLES

The embodiments of the present invention will be described in detail with respect to Examples and Comparative Examples, however, the present invention is not limited to such Examples.

<Synthesis of (Meth)acrylic Resin>

The resin A-1 was synthesized as follows.

110 parts by mass of propylene glycol monomethyl ether acetate was charged into a four-necked flask equipped with a thermometer, a thermostat, a stirrer, a reflux condenser and a dropping device, followed by heating to 110° C.

Subsequently, a mixture of 30 parts by mass of 2-acetoacetoxyethyl methacrylate, 50 parts by mass of dimethylacrylamide, 10 parts by mass of methyl methacrylate, 10 parts by mass of butyl methacrylate, and 1 part by mass of 1,1-azobis-1-cyclohexanecarbonitrile was continuously added dropwise to the four-necked flask over a period of 2 hours from the dropping funnel.

After completion of the dropwise addition, the mixture was further stirred at 110° C. for 4 hours to allow the reaction to proceed. Then, the heating was stopped and the mixture was cooled to room temperature, whereby a resin composition containing (meth)acrylic resin A-1 (solid content: 40% by mass) was obtained.

The weight-average molecular weight of the obtained resin A-1 was 45,000. The glass transition temperature of the resin A-1 calculated theoretically from the blending ratio of the monomers used was 70° C. based on the Fox equation described above.

The weight-average molecular weight was measured and calculated by gel permeation chromatography (GPC). The equipment, conditions, and the like used for GPC were as follows.

Equipment used: HLC8220GPC (manufactured by Tosoh Corporation)
Column used: TSKgel SuperHZN-M, TSKgel GMHXL-H, TSKgel G2500HXL, and TSKgel G5000HXL (manufactured by Tosoh Corporation)
Column temperature: 40° C.
Standard substance: TSKgel Standard Polystyrene A1000, A2500, A5000, F1, F2, F4, and F10 (manufactured by Tosoh Corporation)
Detector: RI (differential refraction) detector
Eluent: Tetrahydrofuran
Flow rate: 1 ml/min The resins A-2 to A-11 were also synthesized in the same manner as the resin A-1. The information for those resins is summarized in Table 1 below.

example, "100 parts by mass" of the (meth)acrylic resin A-1 in Example 1 of Table 2 means that 250 parts by mass of the resin composition containing the resin A-1 (solid content: 40% by mass) are used.

For the coating compositions described as "Heat-cured" in the upper rows of Tables 2 to 7, in addition to the components listed in the tables, the following basic compound (trade name: SA-102: DBU octylate) was used in an amount of 0.5 parts by mass with respect to 100 parts by mass of the total amount of the (meth)acrylic resin and the curing agent.

The sources and structures of the compounds listed in the tables are as follows.

[Curing Agent]
A-DPH: dipentaerythritol hexaacrylate (manufactured by Shin Nakamura Chemical Co., Ltd.)
PETIA: mixture of pentaerythritol triacrylate and pentaerythritol tetraacrylate (manufactured by Daicel-Allnex Ltd.)
DPEA-12: ethylene oxide (EO)-modified dipentaerythritol hexaacrylate (manufactured by Nippon Kayaku Co., Ltd.)

TABLE 1

| Resin No. | | | A-1 | A-2 | A-3 | A-4 | A-5 | A-6 | A-7 | A-8 | A-9 (Comparative) | A-10 (Comparative) | A-11 (Comparative) |
|---|---|---|---|---|---|---|---|---|---|---|---|---|---|
| Monomer blending (parts by mass) | a-1 | AAEM | 30 | 10 | 40 | 30 | 30 | 30 | 30 | 30 | 30 | Not contained | Not contained |
| | a-2 | DMAA | 50 | 50 | 50 | 30 | 70 | | 40 | | Not contained | 50 | 50 |
| | | DEAA | | | | | | 50 | 20 | | | | |
| | | HEAA | | | | | | | | 50 | | | |
| | | N-MAM | | | | | | | | | | | 20 |
| | a-3 | MMA | 10 | 13 | 10 | 30 | 10 | 10 | 10 | 10 | 70 | 14 | 5 |
| | | BMA | 10 | 27 | | 10 | | 10 | | 10 | | 36 | 25 |
| Number-average molecular weight (Mn) | | | 12000 | 20000 | 15000 | 14000 | 16000 | 19000 | 14000 | 13000 | 12000 | 10000 | 15000 |
| Weight-average molecular weight (Mw) | | | 45000 | 49000 | 45000 | 46000 | 47000 | 50000 | 44000 | 43000 | 42000 | 41000 | 47000 |

In the table above, the abbreviations of the monomers are as follows.
AAEM: 2-acetoacetoxyethyl methacrylate
DMAA: dimethyl acrylamide
DEAA: diethyl acrylamide
HEAA: hydroxyethyl acrylamide
N-MAM: N-methylol acrylamide (also known as N-(hydroxymethyl) acrylamide)
MMA: methyl methacrylate
BMA: n-butyl methacrylate <Preparation of Coating Composition>

Each of the components shown in Tables 2 to 7 was uniformly dissolved in isopropanol to prepare a coating composition having a non-volatile component concentration of 30% by mass.

In Table 2 to 7, the amount (parts by mass) of the surfactant is an amount obtained by assuming that the total amount of the resin (parts by mass) and the curing agent (parts by mass) is 100 parts by mass. For example, in Example 1, it means that 2.5 parts by mass of the surfactant was used in the case where the total amount of the (meth) acrylic resin and the curing agent was 100 parts by mass, not meaning that 2.5 parts by mass of the surfactant was used with respect to the total amount of 114 parts by mass of the (meth)acrylic resin and the curing agent.

In Tables 2 to 7, the amount of each non-volatile component is described as the amount of each component. For A-400: polyethylene glycol #400 diacrylate (manufactured by Shin Nakamura Chemical Co., Ltd.)

[Surfactant (Anionic)]
SANMORIN OT-70: sodium dioctyl sulfosuccinate, active ingredient 70% by mass (manufactured by Sanyo Chemical Industries, Ltd.)
Neopelex G-65: sodium dodecylbenzenesulfonate, active ingredient 60% by mass (manufactured by Kao Corporation)
Pelex SS-L: sodium dodecyl diphenyl ether disulfonate, active ingredient 50% by mass (manufactured by Kao Corporation)

[Surfactant (Cationic)]
Catiogen ES-L-9: lauryl dimethylethyl ammonium ethyl sulfate, active ingredient 90% by mass (manufactured by DKS Co. Ltd.)

[Surfactant (Amphoteric)]
SOFTAZOLINE LPB: amidopropyl betaine laurate, active ingredient 30% by mass (manufactured by Kawaken Fine Chemicals Co., Ltd.)
SOFTAZOLINE LSB: lauramidopropyl hydroxysultaine, active ingredient 30% by mass (manufactured by Kawaken Fine Chemicals Co., Ltd.)

[Surfactant (Nonionic)]
Sugar ester L-1695: sucrose laurate, active ingredient 100% (manufactured by Mitsubishi-Chemical Foods Corporation)

Sugar ester M-1695: sucrose myristate, active ingredient 100% (manufactured by Mitsubishi-Chemical Foods Corporation)

RHEODOL TW-L106: polyoxyethylene sorbitan monolaurate (6EO), active ingredient 100% (manufactured by Kao Corporation)

RHEODOL TW-L120: polyoxyethylene sorbitan monolaurate (20EO), active ingredient 100% (manufactured by Kao Corporation)

ML-750: decaglycerin monoester, active ingredient 100% (manufactured by Sakamoto Yakuhin Kogyo Co., Ltd.)

ML-500: hexaglycerin monoester, active ingredient 100% (manufactured by Sakamoto Yakuhin Kogyo Co., Ltd.)

SURFLON S-243: fluorine-based surfactant (EO adduct), 100% active ingredient (manufactured by AGC Seimi Chemical Co., Ltd.)

SURFLON S-242: fluorine-based surfactant (EO adduct), active ingredient 100% (manufactured by AGC Seimi Chemical Co., Ltd.)

[Basic Compound]

SA-102: 1,8-diazabicyclo[5,4,0]undecene-7-octylate (manufactured by San-Apro Ltd.)

<Preparation of Cured Film for Test>

For the coating compositions described as "Heat-cured" in the upper rows of Tables 2 to 7, a test plate on which a cured film was formed was prepared as follows.

Each of the obtained coating compositions was spray-coated on a polycarbonate resin plate (thickness: 2 mm, length: 70 mm×width: 70 mm). The resulting coated article was allowed to stand and heat-cured in a drying oven set at 120° C. for 60 minutes. In this manner, a test plate with a 10 µm thick cured film was obtained.

For the coating compositions described as "Photo-cured" in the upper rows of Tables 2 to 7, a test plate on which a cured film was formed was prepared as follows.

Each of the obtained coating compositions was spray-coated on a polycarbonate resin plate (thickness: 2 mm, length: 70 mm×width: 70 mm). The resulting coated article was allowed to stand in a drying oven set at 80° C. for 3 minutes to volatilize the solvent. Then, the resulting coated article was cured by irradiation of ultraviolet rays under a condition of an integrated light quantity of 500 mJ/cm$^2$ using a high-pressure mercury lamp (manufactured by Eye Graphics Co., Ltd.). In this manner, a test plate with a cured film having a thickness of 10 µm was obtained.

Using the obtained test plates, the following various evaluations were carried out.

<Measurement of Contact Angle>

The contact angle was measured under the conditions of a temperature of 25° C. and a humidity of 50% PE, using an automatic contact angle meter (product number DM-700, manufactured by Kyowa Interface Science Co., Ltd.).

Specifically, pure water was prepared in the syringe of this device and 2 µL of pure water droplet was discharged from the tip of the needle of the syringe, and the coating film on the test plate was brought close to the droplet so that the droplets adhered to the coating film. The contact angle after one second and the contact angle after 20 seconds after the water was in contact with the surface of the coating film in the static state were measured by the θ/2 method. The measurement was carried out at any 10 positions on the film surface, and the average value of measured values was taken as the contact angle.

<Evaluation of Durability of Cured Film>

[Adhesiveness]

The test was carried out based on JIS K5600-5-6 (1999) "Mechanical properties of coating film-adhesiveness (cross cutting method)." The adhesiveness of the cured film to the polycarbonate substrate was evaluated based on the following criteria.

5: The edge of the cut is completely smooth, and there is no peeling in any grid eyes.

4: There is a small peeling of the cured film at the intersection of the cut and the area of the peeled portion is less than 5%.

3: The area of the peeled portion is 5% or more and less than 15%.

2: The area of the peeled portion is 15% or more and less than 35%.

1: The area of the peeled portion is 35% or more.

[Water Resistance]

The test plate was immersed in water at 25° C. for 24 hours by the method according to JIS K-5600-6-1 "Chemical properties of coating film-liquid resistance (general method)." After 24 hours, the test plate was removed from the water and dried at room temperature for 24 hours, and then the appearance of the cured film was visually observed. Evaluation was carried out according to the following criteria.

5: There is no change.

4: Whitening and swelling of the cured film are observed with an area of less than 5% of the entire cured film.

3: Whitening and swelling of the cured film are observed with an area of 5% or more and less than 10% of the entire cured film.

2: Whitening and swelling of the cured film are observed with an area of 10% or more of the entire cured film.

1: The cured film is dissolved.

[Solvent Resistance]

Absorbent cotton impregnated with ethyl acetate was placed on a test plate and rubbed 20 times back and forth with a load of 100 g applied. The state of the cured film after the rubbing was checked and evaluated according to the following criteria.

5: There is no change on the surface.

4: The surface is whitened but immediately returns to its original state.

3: The surface of the cured film is scratched.

2: Part of the cured film peels off.

1: The cured film is dissolved.

<Evaluation of Antifogging>

[Breath Test]

Exhaled air was blown to the test plate under the conditions of room temperature of 25° C. and humidity of 40%. The state of the cured film immediately after blowing the exhaled air for 10 seconds was visually observed and evaluated according to the following criteria.

5: No fogging is observed.

4: Blowing the exhaled air for 5 seconds or more leads to fogging.

3: Blowing the exhaled air for 3 seconds or more leads to fogging.

2: Fogging is observed, but fogging disappears immediately after the end of blowing the exhaled air.

1: Fogging is observed and it takes 10 seconds or more for the fogging to disappear.

[Continuous Steaming Test]

The test plate was placed 5 cm above the water surface of the hot water bath maintained at 60° C. so that the surface of the cured film was directed downward and the steam from the hot water bath was continuously applied for 90 seconds. The state of the cured film thereafter was visually observed and evaluated according to the following criteria.

5: No fogging is observed.

4: There is no fogging, but bubbles are observed in the formed water film.

3: There is no fogging, but the formed water film looks distorted.

2: The formation of the water film is not sufficient and there is slight fogging.

1: The water film is not formed and the entire surface of the cured film is fogged white.

[Water Trail Marks]

After the continuous steaming test, the test plate was left standing vertically and dried at room temperature for 30 minutes. The state of water trail marks on the cured film after drying was visually observed and evaluated according to the following criteria.

5: Water trail marks are not observed.

4: Faint water trail marks are observed depending on the way light is applied.

3: Water trail marks are clearly visible, but the cured film is transparent.

2: Water trail marks are clearly visible, and some whitening of the cured film occurs.

1: Water trail marks are clearly visible, and whitening of the cured film is significant.

[Repeated Steaming Test]

The test plate was placed 5 cm above the water surface of the hot water bath maintained at 60° C. so that the surface of the coating film was directed downward. The steam from the hot water bath was applied to the cured film for 10 seconds and then the cured film was dried for 5 minutes at room temperature and normal humidity. This cycle was set as a single step and this step was repeated 10 times. Then, the state of the cured film after re-application of steam for 10 seconds was visually checked and evaluated according to the following criteria.

5: No fogging is observed.

4: Fogging is not observed, but the formed water film looks distorted.

3: Immediate fogging is observed immediately after the steam is applied, but a water film is formed immediately and the fogging is eliminated.

2: Fogging is observed immediately after the steam is applied, but a water film is formed after several seconds and fogging is eliminated.

1: A water film is not formed and it is foggy.

[Antifogging Properties after Wiping Off]

After washing the test plate with running water for 60 seconds, the water was wiped off with a tissue. Thereafter, the foregoing[Continuous steaming test] was carried out, and the state of the cured film after 90 seconds from the completion of steaming was visually observed and evaluated according to the following criteria.

5: No fogging is observed.

4: Fogging is not observed, but the formed water film looks distorted.

3: Immediate fogging is observed immediately after the steam is applied, but a water film is formed immediately and the fogging is eliminated.

2: Fogging is observed immediately after the steam is applied, but a water film is formed after several seconds and fogging is eliminated.

1: A water film is not formed and it is foggy.

<Evaluation of Secondary Properties>

[Moisture Resistance Test]

The test plate was allowed to stand in an atmosphere having a temperature of 50±2° C. and a humidity of 98±2% for 240 hours by the method according to JIS K-5600-7-2 "Long-term durability of coating film-moisture resistance (continuous dew condensation method), and the surface of the coating film was observed within 1 hour thereafter.

5: There is no change.

4: Whitening and swelling of the cured film are observed with an area of less than 5% of the entire cured film.

3: Whitening and swelling of the cured film are observed with an area of 5% or more and less than 10% of the entire cured film.

2: Whitening and swelling of the cured film are observed with an area of 10% or more of the entire cured film.

1: The cured film is dissolved.

[Antifogging Properties after Moisture Resistance Test]

Using the test plate after the foregoing [Moisture resistance test], the same test as in the foregoing [Continuous steaming test] was carried out to evaluate antifogging properties.

5: No fogging is observed.

4: There is no fogging, but bubbles are observed in the formed water film.

3: There is no fogging, but the formed water film looks distorted.

2: The formation of a water film is not sufficient and there is slight fogging.

1: A water film is not formed and the entire cured film is fogged white.

[Heat Resistance Test]

The test plate was allowed to stand in an atmosphere at a temperature of 120° C.±2° C. for 240 hours by the method according to JIS K-5600-6-3 "Chemical properties of coating film-heat resistance" and the surface of the coating film was observed within 1 hour thereafter.

5: There is no change.

4: Color change or cracking of the cured film is observed in an area of less than 3% of the entire cured film.

3: Color change or cracking of the cured film is observed in an area of 3% or more and less than 10% of the entire cured film.

2: Color change or cracking of the cured film is observed in an area of 10% or more and less than 50% of the entire cured film.

1: Color change or cracking of the cured film is observed in an area of 50% or more of the entire cured film.

[Antifogging Properties after Heat Resistance Test]

The same evaluation as in the foregoing [Antifogging properties after moisture resistance test] was carried out, except that, in the evaluation of [Antifogging properties after moisture resistance test], the test plate after the heat resistance test was used in place of the test plate after the moisture resistance test. The criteria for evaluation are the same as above.

TABLE 2

|  |  | Evaluation form | | | | | | | |
|---|---|---|---|---|---|---|---|---|---|
|  |  | Heat-cured Example No. | | | | | | | |
|  |  | 1 | 2 | 3 | 4 | 5 | 6 | 7 | 8 |
| (Meth)acrylic resin | Resin No. | A-1 | A-1 | A-1 | A-1 | A-1 | A-1 | A-1 | A-1 |
|  | Amount used (relative amount to curing agent) | 100 | 100 | 100 | 100 | 100 | 100 | 100 | 100 |
| Curing agent | A-DPH | 14 | 14 | 14 | 14 | 14 | 14 | 14 | 14 |
|  | PETIA |  |  |  |  |  |  |  |  |
|  | DPEA-12 |  |  |  |  |  |  |  |  |
|  | A-400 |  |  |  |  |  |  |  |  |
|  | Total amount of (meth)acrylic resin and curing agent | 100 | 100 | 100 | 100 | 100 | 100 | 100 | 100 |
| Surfactant | Anionic SANMORIN OT-70 | 2.5 | 3.7 | 6.1 |  |  |  |  |  |
|  | NEOPELEX G-65 |  |  |  | 2.5 |  |  |  |  |
|  | PELEX SS-L |  |  |  |  | 2.5 |  |  |  |
|  | Cationic CATIOGEN ES-L-9 |  |  |  |  |  | 2.5 |  |  |
|  | Amphoteric SOFTAZOLINE LPB |  |  |  |  |  |  | 2.5 |  |
|  | SOFTAZOLINE LSB |  |  |  |  |  |  |  | 2.5 |
|  | Nonionic Sugar ester L-1695 |  |  |  |  |  |  |  |  |
|  | Sugar ester M-1695 |  |  |  |  |  |  |  |  |
|  | RHEODOL TW-L106 |  |  |  |  |  |  |  |  |
|  | RHEODOL TW-L120 |  |  |  |  |  |  |  |  |
|  | ML-750 |  |  |  |  |  |  |  |  |
|  | ML-500 |  |  |  |  |  |  |  |  |
|  | SURFLON S-243 |  |  |  |  |  |  |  |  |
|  | SURFLON S-242 |  |  |  |  |  |  |  |  |
| Contact angle (°) | $\theta_1$ (after 1 second) | 40 | 27 | 30 | 35 | 45 | 44 | 50 | 50 |
|  | $\theta_2$ (after 20 seconds) | 9 | 4 | 4 | 6 | 38 | 43 | 31 | 40 |
|  | $\theta_1 - \theta_2$ | 31 | 23 | 26 | 29 | 6 | 1 | 19 | 10 |
| Evaluation results | Evaluation of durability Adhesiveness | 5 | 5 | 5 | 5 | 5 | 5 | 5 | 5 |
|  | Water resistance | 5 | 5 | 5 | 5 | 5 | 5 | 5 | 5 |
|  | Solvent resistance | 5 | 5 | 5 | 5 | 5 | 5 | 5 | 5 |
|  | Evaluation of antifogging Breath test | 5 | 5 | 5 | 5 | 5 | 5 | 5 | 5 |
|  | Continuous steaming test | 5 | 5 | 5 | 3 | 3 | 5 | 3 | 4 |
|  | Water trail marks | 2 | 1 | 1 | 1 | 1 | 2 | 2 | 2 |
|  | Repeated steaming test | 5 | 5 | 5 | 3 | 3 | 4 | 4 | 5 |
|  | Antifogging properties after wiping off | 5 | 5 | 5 | 3 | 3 | 1 | 3 | 4 |
|  | Evaluation of secondary properties Moisture resistance test | 5 | 4 | 3 | 2 | 2 | 5 | 5 | 5 |
|  | Antifogging properties after moisture resistance test | 1 | 2 | 2 | 2 | 2 | 1 | 1 | 1 |
|  | Heat resistance test | 5 | 5 | 5 | 5 | 5 | 3 | 5 | 5 |
|  | Antifogging properties after heat resistance test | 5 | 5 | 5 | 4 | 4 | 2 | 4 | 4 |

TABLE 3

|  |  | Evaluation form | | | | | | | | | | |
|---|---|---|---|---|---|---|---|---|---|---|---|---|
|  |  | Heat-cured Example No. | | | | | | | | | | |
|  |  | 9 | 10 | 11 | 12 | 13 | 14 | 15 | 16 | 17 | 18 | 19 |
| (Meth)acrylic resin | Resin No. | A-1 | A-1 | A-1 | A-1 | A-1 | A-1 | A-1 | A-1 | A-1 | A-1 | A-1 |
|  | Amount used (relative amount to curing agent) | 100 | 100 | 100 | 100 | 100 | 100 | 100 | 100 | 100 | 100 | 100 |
| Curing agent | A-DPH | 14 | 14 | 14 | 14 | 14 | 14 | 14 | 14 | 14 | 14 | 14 |
|  | PETIA |  |  |  |  |  |  |  |  |  |  |  |
|  | DPEA-12 |  |  |  |  |  |  |  |  |  |  |  |
|  | A-400 |  |  |  |  |  |  |  |  |  |  |  |
|  | Total amount of (meth)acrylic resin and curing agent | 100 | 100 | 100 | 100 | 100 | 100 | 100 | 100 | 100 | 100 | 100 |
| Surfactant | Anionic SANMORIN OT-70 |  |  |  |  |  |  |  |  |  |  |  |
|  | NEOPELEX G-65 |  |  |  |  |  |  |  |  |  |  |  |
|  | PELEX SS-L |  |  |  |  |  |  |  |  |  |  |  |
|  | Cationic CATIOGEN ES-L-9 |  |  |  |  |  |  |  |  |  |  |  |
|  | Amphoteric SOFTAZOLINE LPB |  |  |  |  |  |  |  |  |  |  |  |
|  | SOFTAZOLINE LSB |  |  |  |  |  |  |  |  |  |  |  |
|  | Nonionic Sugar ester L-1695 | 1.3 | 2.5 | 4 | 6 |  |  |  |  |  |  |  |
|  | Sugar ester M-1695 |  |  |  |  | 2.5 |  |  |  |  |  |  |
|  | RHEODOL TW-L106 |  |  |  |  |  | 2.5 |  |  |  |  |  |
|  | RHEODOL TW-L120 |  |  |  |  |  |  | 2.5 |  |  |  |  |
|  | ML-750 |  |  |  |  |  |  |  | 2.5 |  |  |  |
|  | ML-500 |  |  |  |  |  |  |  |  | 2.5 |  |  |
|  | SURFLON S-243 |  |  |  |  |  |  |  |  |  | 2.5 |  |
|  | SURFLON S-242 |  |  |  |  |  |  |  |  |  |  | 2.5 |

TABLE 3-continued

|  |  | Evaluation form |  |  |  |  |  |  |  |  |  |  |
|---|---|---|---|---|---|---|---|---|---|---|---|---|
|  |  | Heat-cured Example No. | | | | | | | | | | |
|  |  | 9 | 10 | 11 | 12 | 13 | 14 | 15 | 16 | 17 | 18 | 19 |
| Contact angle (°) | θ₁ (after 1 second) | 68 | 59 | 46 | 58 | 57 | 58 | 50 | 62 | 61 | 57 | 50 |
|  | θ₂ (after 20 seconds) | 43 | 35 | 24 | 25 | 43 | 52 | 47 | 47 | 46 | 43 | 44 |
|  | θ₁ − θ₂ | 25 | 24 | 22 | 33 | 14 | 6 | 3 | 15 | 14 | 14 | 6 |
| Evaluation results | Evaluation of durability | | | | | | | | | | | |
|  | Adhesiveness | 5 | 5 | 5 | 5 | 5 | 5 | 5 | 5 | 5 | 5 | 5 |
|  | Water resistance | 5 | 5 | 5 | 5 | 5 | 5 | 5 | 5 | 5 | 5 | 5 |
|  | Solvent resistance | 5 | 5 | 5 | 5 | 5 | 5 | 5 | 5 | 5 | 5 | 5 |
|  | Evaluation of antifogging | | | | | | | | | | | |
|  | Breath test | 5 | 5 | 5 | 5 | 5 | 5 | 5 | 5 | 5 | 5 | 5 |
|  | Continuous steaming test | 2 | 4 | 5 | 5 | 3 | 2 | 2 | 2 | 2 | 5 | 5 |
|  | Water trail marks | 5 | 4 | 4 | 2 | 4 | 3 | 3 | 3 | 4 | 3 | 3 |
|  | Repeated steaming test | 4 | 4 | 4 | 4 | 4 | 5 | 5 | 5 | 4 | 5 | 5 |
|  | Antifogging properties after wiping off | 4 | 4 | 5 | 5 | 3 | 2 | 2 | 2 | 2 | 5 | 5 |
|  | Evaluation of secondary properties | | | | | | | | | | | |
|  | Moisture resistance test | 5 | 5 | 4 | 3 | 5 | 5 | 5 | 5 | 5 | 5 | 5 |
|  | Antifogging properties after moisture resistance test | 4 | 4 | 5 | 5 | 4 | 4 | 4 | 4 | 4 | 4 | 4 |
|  | Heat resistance test | 5 | 5 | 5 | 5 | 5 | 4 | 4 | 4 | 5 | 5 | 5 |
|  | Antifogging properties after heat resistance test | 1 | 1 | 1 | 1 | 1 | 1 | 1 | 1 | 2 | 1 | 1 |

TABLE 4

|  |  |  | Evaluation form |  |  |  |  |  |  |  |  |  |
|---|---|---|---|---|---|---|---|---|---|---|---|---|
|  |  |  | Heat-cured Example No. | | | | | | | | | |
|  |  |  | 20 | 21 | 22 | 23 | 24 | 25 | 26 | 27 | 28 | 29 |
| (Meth)acrylic resin | Resin No. | | A-1 | A-1 | A-1 | A-1 | A-1 | A-1 | A-1 | A-1 | A-1 | A-1 |
|  | Amount used (relative amount to curing agent) | | 100 | 100 | 100 | 100 | 100 | 100 | 100 | 100 | 100 | 100 |
| Curing agent | A-DPH | | 14 | 14 | 14 | 14 | 14 | 14 | 14 | 14 | 14 | 14 |
|  | PETIA | | | | | | | | | | | |
|  | DPEA-12 | | | | | | | | | | | |
|  | A-400 | | | | | | | | | | | |
|  | Total amount of (meth)acrylic resin and curing agent | | 100 | 100 | 100 | 100 | 100 | 100 | 100 | 100 | 100 | 100 |
| Surfactant | Anionic | SANMORIN OT-70 | 1.3 | 1.3 | 1.3 | 1.3 | 1.3 | 1.3 | 2.6 | 3.9 | 2.1 | 2.6 |
|  |  | NEOPELEX G-65 | | | | | | | | | | |
|  |  | PELEX SS-L | | | | | | | | | | |
|  | Cationic | CATIOGEN ES-L-9 | | | | | | | | | | |
|  | Amphoteric | SOFTAZOLINE LPB | | | | | | | | | | |
|  |  | SOFTAZOLINE LSB | | | | | | | | | | |
|  | Nonionic | Sugar ester L-1695 | 2.5 | | | | | 1.3 | 1.3 | 1.3 | 2.1 | 2.5 |
|  |  | Sugar ester M-1695 | | | | | | | | | | |
|  |  | RHEODOL TW-L106 | | 2.5 | | | | | | | | |
|  |  | RHEODOL TW-L120 | | | 2.5 | | | | | | | |
|  |  | ML-750 | | | | 2.5 | | | | | | |
|  |  | ML-500 | | | | | 2.5 | | | | | |
|  |  | SURFLON S-243 | | | | | | | | | | |
|  |  | SURFLON S-242 | | | | | | | | | | |
| Contact angle (°) | θ₁ (after 1 second) | | 34 | 50 | 50 | 60 | 65 | 50 | 33 | 38 | 41 | 33 |
|  | θ₂ (after 20 seconds) | | 6 | 14 | 10 | 49 | 51 | 13 | 5 | 4 | 10 | 5 |
|  | θ₁ − θ₂ | | 29 | 36 | 40 | 12 | 15 | 37 | 28 | 34 | 31 | 28 |
| Evaluation results | Evaluation of durability | | | | | | | | | | | |
|  | Adhesiveness | | 5 | 5 | 5 | 5 | 5 | 5 | 5 | 5 | 5 | 5 |
|  | Water resistance | | 5 | 5 | 5 | 5 | 5 | 5 | 5 | 5 | 5 | 5 |
|  | Solvent resistance | | 5 | 5 | 5 | 5 | 5 | 5 | 5 | 5 | 5 | 5 |
|  | Evaluation of antifogging | | | | | | | | | | | |
|  | Breath test | | 5 | 5 | 5 | 5 | 5 | 5 | 5 | 5 | 5 | 5 |
|  | Continuous steaming test | | 5 | 5 | 5 | 5 | 5 | 4 | 5 | 5 | 5 | 5 |
|  | Water trail marks | | 5 | 4 | 4 | 3 | 5 | 5 | 3 | 2 | 3 | 2 |
|  | Repeated steaming test | | 5 | 5 | 5 | 5 | 5 | 4 | 4 | 5 | 4 | 5 |
|  | Antifogging properties after wiping off | | 5 | 5 | 5 | 5 | 5 | 4 | 5 | 5 | 5 | 5 |
|  | Evaluation of secondary properties | | | | | | | | | | | |
|  | Moisture resistance test | | 5 | 5 | 5 | 5 | 5 | 5 | 4 | 3 | 4 | 5 |
|  | Antifogging properties after moisture resistance test | | 5 | 5 | 5 | 5 | 5 | 4 | 4 | 4 | 4 | 5 |
|  | Heat resistance test | | 5 | 5 | 5 | 5 | 5 | 5 | 5 | 5 | 5 | 5 |
|  | Antifogging properties after heat resistance test | | 5 | 5 | 5 | 5 | 5 | 5 | 5 | 5 | 5 | 5 |

TABLE 5

| | | | Evaluation form | | | | | | | | | |
|---|---|---|---|---|---|---|---|---|---|---|---|---|
| | | | Heat-cured | Heat-cured | Heat-cured | Heat-cured | Heat-cured | Heat-cured | Heat-cured | Heat-cured | Heat-cured | Heat-cured |
| | | | Example No. | | | | | | | | | |
| | | | 30 | 31 | 32 | 33 | 34 | 35 | 36 | 37 | 38 | 39 |
| (Meth)acrylic resin | Resin No. | | A-2 | A-3 | A-4 | A-5 | A-6 | A-7 | A-8 | A-1 | A-1 | A-1 |
| | Amount used (relative amount to curing agent) | | 100 | 100 | 100 | 100 | 100 | 100 | 100 | 100 | 100 | 100 |
| Curing agent | A-DPH | | 4.4 | 18.5 | 14 | 14 | 14 | 14 | 14 | 7 | 25 | 50 |
| | PETIA | | | | | | | | | | | |
| | DPEA-12 | | | | | | | | | | | |
| | A-400 | | | | | | | | | | | |
| | Total amount of (meth)acrylic resin and curing agent | | 100 | 100 | 100 | 100 | 100 | 100 | 100 | 100 | 100 | 100 |
| Surfactant | Anionic | SANMORIN OT-70 | 1.3 | 1.3 | 1.3 | 1.3 | 1.3 | 1.3 | 1.3 | 1.3 | 1.3 | 1.3 |
| | | NEOPELEX G-65 | | | | | | | | | | |
| | | PELEX SS-L | | | | | | | | | | |
| | Cationic | CATIOGEN ES-L-9 | | | | | | | | | | |
| | Amphoteric | SOFTAZOLINE LPB | | | | | | | | | | |
| | | SOFTAZOLINE LSB | | | | | | | | | | |
| | Nonionic | Sugar ester L-1695 | 2.5 | 2.5 | 2.5 | 2.5 | 2.5 | 2.5 | 2.5 | 2.5 | 2.5 | 2.5 |
| | | Sugar ester M-1695 | | | | | | | | | | |
| | | RHEODOL TW-L106 | | | | | | | | | | |
| | | RHEODOL TW-L120 | | | | | | | | | | |
| | | ML-750 | | | | | | | | | | |
| | | ML-500 | | | | | | | | | | |
| | | SURFLON S-243 | | | | | | | | | | |
| | | SURFLON S-242 | | | | | | | | | | |
| Contact angle (°) | | $\theta_1$ (after 1 second) | 50 | 50 | 43 | 50 | 50 | 50 | 50 | 50 | 50 | 50 |
| | | $\theta_2$ (after 20 seconds) | 12 | 23 | 10 | 20 | 15 | 9 | 4 | 14 | 10 | 14 |
| | | $\theta_1 - \theta_2$ | 38 | 27 | 33 | 30 | 35 | 41 | 46 | 36 | 40 | 36 |
| Evaluation results | Evaluation of durability | Adhesiveness | 5 | 4 | 5 | 4 | 5 | 5 | 5 | 5 | 4 | 4 |
| | | Water resistance | 4 | 5 | 5 | 3 | 5 | 5 | 4 | 5 | 5 | 4 |
| | | Solvent resistance | 3 | 5 | 5 | 5 | 5 | 5 | 5 | 5 | 5 | 5 |
| | Evaluation of antifogging | Breath test | 5 | 5 | 4 | 5 | 4 | 5 | 5 | 5 | 5 | 5 |
| | | Continuous steaming test | 5 | 5 | 5 | 5 | 5 | 5 | 5 | 5 | 3 | 3 |
| | | Water trail marks | 4 | 5 | 5 | 4 | 5 | 5 | 5 | 5 | 5 | 5 |
| | | Repeated steaming test | 4 | 5 | 4 | 5 | 5 | 5 | 4 | 5 | 5 | 5 |
| | | Antifogging properties after wiping off | 3 | 5 | 3 | 5 | 5 | 5 | 4 | 5 | 3 | 3 |
| | Evaluation of secondary properties | Moisture resistance test | 4 | 5 | 5 | 3 | 5 | 5 | 4 | 4 | 4 | 4 |
| | | Antifogging properties after moisture resistance test | 4 | 4 | 3 | 2 | 4 | 5 | 5 | 4 | 3 | 2 |
| | | Heat resistance test | 4 | 5 | 5 | 5 | 4 | 5 | 5 | 5 | 5 | 5 |
| | | Antifogging properties after heat resistance test | 4 | 5 | 3 | 2 | 4 | 5 | 5 | 5 | 4 | 3 |

TABLE 6

| | | | Evaluation form | | | | | | | | | |
|---|---|---|---|---|---|---|---|---|---|---|---|---|
| | | | Heat-cured | Heat-cured | Heat-cured | Photo-cured | Photo-cured | Photo-cured | Photo-cured | Photo-cured | Photo-cured |
| | | | Example No. | | | | | | | | |
| | | | 40 | 41 | 42 | 43 | 44 | 45 | 46 | 47 | 48 |
| (Meth)acrylic resin | Resin No. | | A-1 | A-1 | A-1 | A-1 | A-1 | A-1 | A-1 | A-1 | A-1 |
| | Amount used (relative amount to curing agent) | | 100 | 100 | 100 | 100 | 100 | 100 | 100 | 100 | 100 |
| Curing agent | A-DPH | | | | | 7 | 25 | 50 | 14 | 14 | 14 |
| | PETIA | | 13 | | | | | | | | |
| | DPEA-12 | | | 25 | | | | | | | |
| | A-400 | | | | 30 | | | | | | |
| | Total amount of (meth)acrylic resin and curing agent | | 100 | 100 | 100 | 100 | 100 | 100 | 100 | 100 | 100 |
| Surfactant | Anionic | SANMORIN OT-70 | 1.3 | 1.3 | 1.3 | 1.3 | 1.3 | 1.3 | 1.3 | 1.3 | 1.3 |
| | | NEOPELEX G-65 | | | | | | | | | |
| | | PELEX SS-L | | | | | | | | | |
| | Cationic | CATIOGEN ES-L-9 | | | | | | | | | |
| | Amphoteric | SOFTAZOLINE LPB | | | | | | | | | |
| | | SOFTAZOLINE LSB | | | | | | | | | |
| | Nonionic | Sugar ester L-1695 | 2.5 | 2.5 | 2.5 | 2.5 | 2.5 | 2.5 | 2.5 | | |
| | | Sugar ester M-1695 | | | | | | | | | |
| | | RHEODOL TW-L106 | | | | | | | | 2.5 | |
| | | RHEODOL TW-L120 | | | | | | | | | 2.5 |
| | | ML-750 | | | | | | | | | |
| | | ML-500 | | | | | | | | | |

TABLE 6-continued

|  |  |  | Evaluation form |  |  |  |  |  |  |  |  |
|---|---|---|---|---|---|---|---|---|---|---|---|
|  |  |  | Heat-cured | Heat-cured | Heat-cured | Photo-cured | Photo-cured | Photo-cured | Photo-cured | Photo-cured | Photo-cured |
|  |  |  | Example No. | | | | | | | | |
|  |  |  | 40 | 41 | 42 | 43 | 44 | 45 | 46 | 47 | 48 |
|  |  | SURFLON S-243 | | | | | | | | | |
|  |  | SURFLON S-242 | | | | | | | | | |
| Contact angle (°) |  | θ₁ (after 1 second) | 50 | 47 | 50 | 50 | 50 | 50 | 40 | 45 | 47 |
|  |  | θ₂ (after 20 seconds) | 13 | 16 | 12 | 12 | 12 | 20 | 11 | 14 | 10 |
|  |  | θ₁ − θ₂ | 37 | 31 | 38 | 38 | 38 | 30 | 29 | 31 | 37 |
| Evaluation results | Evaluation of durability | Adhesiveness | 5 | 5 | 5 | 5 | 4 | 4 | 5 | 5 | 5 |
|  |  | Water resistance | 5 | 5 | 4 | 5 | 5 | 5 | 5 | 5 | 5 |
|  |  | Solvent resistance | 5 | 4 | 3 | 5 | 5 | 5 | 5 | 5 | 5 |
|  | Evaluation of antifogging | Breath test | 5 | 5 | 5 | 5 | 5 | 4 | 5 | 5 | 5 |
|  |  | Continuous steaming test | 5 | 5 | 5 | 5 | 4 | 3 | 5 | 5 | 5 |
|  |  | Water trail marks | 5 | 5 | 5 | 5 | 5 | 5 | 5 | 4 | 4 |
|  |  | Repeated steaming test | 5 | 5 | 5 | 5 | 5 | 4 | 5 | 5 | 5 |
|  |  | Antifogging properties after wiping off | 5 | 5 | 5 | 5 | 4 | 3 | 5 | 5 | 5 |
|  | Evaluation of secondary properties | Moisture resistance test | 5 | 5 | 4 | 5 | 5 | 5 | 5 | 5 | 5 |
|  |  | Antifogging properties after moisture resistance test | 5 | 5 | 4 | 4 | 4 | 3 | 5 | 5 | 5 |
|  |  | Heat resistance test | 5 | 5 | 5 | 5 | 5 | 5 | 5 | 5 | 5 |
|  |  | Antifogging properties after heat resistance test | 5 | 5 | 5 | 5 | 4 | 3 | 5 | 5 | 5 |

TABLE 7

|  |  |  | Evaluation form |  |  |  |  |
|---|---|---|---|---|---|---|---|
|  |  |  | Heat-cured | Heat-cured | Heat-cured | Heat-cured | Heat-cured |
|  |  |  | Comparative Example No. | | | | |
|  |  |  | 1 | 2 | 3 | 4 | 5 |
| (Meth)acrylic resin | Resin No. |  | A-9 | A-10 | A-11 | A-1 | A-1 |
|  | Amount used (relative amount to curing agent) |  | 100 | 100 | 100 | 100 | 100 |
| Curing agent | A-DPH |  | 14 | 14 | Not contained | 14 | Not contained |
|  | PETIA |  | | | | | |
|  | A-400 |  | | | | | |
|  | Total amount of (meth)acrylic resin and curing agent |  | 100 | 100 | 100 | 100 | 100 |
| Surfactant | Anionic | SANMORIN OT-70 | 1.3 | 1.3 | 1.3 | Not contained | 1.3 |
|  |  | NEOPELEX G-65 | | | | | |
|  |  | PELEX SS-L | | | | | |
|  | Cationic | CATIOGEN ES-L-9 | | | | | |
|  | Amphoteric | SOFTAZOLINE LPB | | | | | |
|  |  | SOFTAZOLINE LSB | | | | | |
|  | Nonionic | Sugar ester L-1695 | 2.5 | 2.5 | 2.5 | | 2.5 |
|  |  | Sugar ester M-1695 | | | | | |
|  |  | RHEODOL TW-L106 | | | | | |
|  |  | RHEODOL TW-L120 | | | | | |
|  |  | ML-750 | | | | | |
|  |  | ML-500 | | | | | |
|  |  | SURFLON S-243 | | | | | |
|  |  | SURFLON S-242 | | | | | |
| Contact angle (°) |  | θ₁ (after 1 second) | 14 | 10 | 20 | 70 | 20 |
|  |  | θ₂ (after 20 seconds) | 4 | 2 | 7 | 65 | 10 |
|  |  | θ₁ − θ₂ | 10 | 8 | 13 | 5 | 10 |
| Evaluation results | Evaluation of durability | Adhesiveness | 5 | 5 | 5 | 5 | 5 |
|  |  | Water resistance | 2 | 1 | 2 | 5 | 1 |
|  |  | Solvent resistance | 2 | 1 | 2 | 5 | 1 |
|  | Evaluation of antifogging | Breath test | 5 | 5 | 5 | 5 | 5 |
|  |  | Continuous steaming test | 1 | 3 | 5 | 1 | 1 |
|  |  | Water trail marks | 1 | 3 | 5 | 5 | 1 |
|  |  | Repeated steaming test | 1 | 3 | 5 | 1 | 1 |
|  |  | Antifogging properties after wiping off | 1 | 1 | 1 | 1 | 1 |
|  | Evaluation of secondary properties | Moisture resistance test | 1 | 1 | 2 | 5 | 1 |
|  |  | Antifogging properties after moisture resistance test | 1 | 1 | 1 | 1 | 1 |
|  |  | Heat resistance test | 4 | 3 | 4 | 5 | 1 |
|  |  | Antifogging properties after heat | 2 | 4 | 2 | 1 | 1 |

As shown in Tables 2 to 7, the cured film formed from the compositions of Examples 1 to 48 containing all of the specific (meth)acrylic resin (A), the curing agent (B), and the surfactant (C) exhibited a good durability (adhesiveness, water resistance, and solvent resistance) as a film and a good anti-fogging performance, due to a combination (synergistic effect) of the respective components. In particular, significant antifogging effects were obtained even in a severe test such as a continuous steaming test or a repeated steaming test.

On the other hand, in Comparative Examples 1 to 3 using resins (A-9, A-10 and A-11) containing no structural unit (a1) having an acetoacetoxy group or a structural unit (a2) having an amide group as a (meth)acrylic resin, the durability (water resistance and solvent resistance) of the film itself was significantly inferior to that of the Examples, which was a practically undesirable result.

In addition, in Comparative Example 4 containing the specific (meth)acrylic resin (A) and the curing agent (B) but not containing the surfactant (C), antifogging effects could not be confirmed in a severe test such as a continuous steaming test or a repeated steaming test. (Incidentally, in Comparative Example 4, the evaluation result of "water trail marks" is satisfactory, but this is due to the absence of a surfactant, which is a natural result.)

Further, in Comparative Example 5 containing the specific (meth)acrylic resin (A) and the surfactant (C) but not containing the curing agent (B), the durability (water resistance and solvent resistance) of the film itself was significantly inferior to that of the Examples, and the results for the evaluation of antifogging properties and the evaluation of secondary physical properties were also significantly inferior to those of the Examples.

In the Examples, in particular, those using dialkyl sulfosuccinate as a surfactant (Examples 1 to 3, and the like), those using an amphoteric compound as a surfactant (Examples 7 and 8, and the like), those using a sucrose fatty acid ester as a surfactant (Examples 9 to 13, and the like), and those using a fluorine-based nonionic compound as a surfactant (Examples 18 and 19, and the like) tend to exhibit a good antifogging performance even under severe evaluations such as continuous steaming test, repeated steaming test, and antifogging properties after wiping off.

In addition, those in which an anionic surfactant and a nonionic surfactant as surfactants were used in combination (Examples 20 to 48) also tend to exhibit a good antifogging performance even under severe evaluations such as continuous steaming test and repeated steaming test.

Further, it can be seen that, as an overall tendency, "antifogging properties after wiping off" tend to be superior in the Examples in which the value of $\theta_1-\theta_2$ is 5° or more and the value of $\theta_2$ is 45° or less, as compared with the Examples which is not so (for example, Example 6). It is inferred that adjustment of the bleed-out properties of the surfactant (C) and the like are related to the expression of higher level antifogging properties.

The invention claimed is:

1. A coating composition, comprising:
   a (meth)acrylic resin (A) containing a structural unit (a1) having an acetoacetoxy group and a structural unit (a2) having an amide group;
   a curing agent (B); and
   a surfactant (C).

2. The coating composition according to claim 1, wherein a contact angle $\theta_1$ of a cured film having a film thickness of 10 μm, which is formed using the coating composition, after one second from the contact of the cured film with water is 70° or less.

3. The coating composition according to claim 2, wherein the value of $\theta_1-\theta_2$ is 5° or more and the value of 82 is 45° or less in the case where a contact angle of the cured film having a film thickness of 10 μm, which is formed using the coating composition, after 20 seconds from the contact of the cured film with water is defined as $\theta_2$.

4. The coating composition according to claim 1, wherein the surfactant (C) includes at least one selected from the group consisting of a dialkyl sulfosuccinate, an amphoteric compound, a sucrose fatty acid ester, and a fluorine-based nonionic compound.

5. The coating composition according to claim 1, wherein the surfactant (C) includes at least one anionic surfactant and at least one nonionic surfactant.

6. The coating composition according to claim 1, wherein the curing agent (B) includes a polyfunctional (meth)acrylate compound.

7. The coating composition according to claim 1, further comprising:
   a basic compound (D).

8. A coating material, comprising:
   a first coating material precursor composition contained in a first container; and
   a second coating material precursor composition contained in a second container,
   wherein the first coating material precursor composition contains a (meth)acrylic resin (A) having a structural unit (a1) having an acetoacetoxy group and a structural unit (a2) having an amide group and does not contain a curing agent (B),
   the second coating material precursor composition contains the curing agent (B) and does not contain the (meth)acrylic resin (A), and
   the first coating material precursor composition and/or the second coating material precursor composition contains a surfactant (C).

9. A cured film of the coating composition according to claim 1.

10. An article comprising the cured film according to claim 9.

11. A method for producing an article having a cured film, comprising:
    a coating step of coating a substrate with the coating composition according to claim 1; and
    a heat curing step of heating the coating composition coated on the substrate to cure the coating composition.

12. A method for producing an article having a cured film, comprising:
    a coating step of coating a substrate with the coating composition according to claim 1; and
    a photo-curing step of irradiating the coating composition coated on the substrate with actinic rays to cure the coating composition.

* * * * *